US011042219B2

(12) United States Patent
Chen

(10) Patent No.: US 11,042,219 B2
(45) Date of Patent: Jun. 22, 2021

(54) SMART WEARABLE APPARATUS, SMART WEARABLE EQUIPMENT AND CONTROL METHOD OF SMART WEARABLE EQUIPMENT

(71) Applicant: Zhaosheng Chen, Beijing (CN)

(72) Inventor: Zhaosheng Chen, Beijing (CN)

( * ) Notice: Subject to any disclaimer, the term of this patent is extended or adjusted under 35 U.S.C. 154(b) by 0 days.

(21) Appl. No.: 16/758,414

(22) PCT Filed: Nov. 14, 2018

(86) PCT No.: PCT/CN2018/115419
§ 371 (c)(1),
(2) Date: Apr. 23, 2020

(87) PCT Pub. No.: WO2019/096161
PCT Pub. Date: May 23, 2019

(65) Prior Publication Data
US 2020/0249757 A1 Aug. 6, 2020

(30) Foreign Application Priority Data

Nov. 16, 2017 (CN) .......................... 201711140754.7

(51) Int. Cl.
*G06F 3/01* (2006.01)
(52) U.S. Cl.
CPC .................................... *G06F 3/014* (2013.01)
(58) Field of Classification Search
CPC ........ G06F 3/014; G06F 3/017; B25J 13/025; B25J 19/0004; B25J 9/1689; F16D 55/00; G09G 2370/16
See application file for complete search history.

(56) References Cited

U.S. PATENT DOCUMENTS 5,328,446 A * 7/1994 Bunnell ................ A61F 5/0125
482/131
5,415,256 A * 5/1995 Weigand ................ F16D 65/12
192/13 R
(Continued)

FOREIGN PATENT DOCUMENTS

CN 104461018 A 3/2015
CN 105189050 A 12/2015
(Continued)

*Primary Examiner* — William Lu
(74) *Attorney, Agent, or Firm* — Bayramoglu Law Offices LLC

(57) ABSTRACT

A smart wearable apparatus, smart wearable equipment, and a control method of the smart wearable equipment are provided. The smart wearable apparatus includes a rigid body, at least one hinge mechanism, a brake and a controller. The hinge mechanism is arranged on the rigid body, and the hinge mechanism includes a first pivot portion, a second pivot portion, and a pivot arranged between the first pivot portion and the second pivot portion. By means of the hinge mechanism, two portions of the rigid body, which are connected, respectively, to the first pivot portion and the second pivot portion of the hinge mechanism, can pivot relative to each other in a first direction. The brake is connected to the hinge mechanism, and the brake can receive a first control signal from the controller to stop the hinge mechanism, thereby stopping the two portions of the rigid body from relatively pivoting.

12 Claims, 4 Drawing Sheets

(56) References Cited

U.S. PATENT DOCUMENTS

| | | | |
|---|---|---|---|
| 6,182,301 B1* | 2/2001 | Krueger | A47K 13/10 4/246.1 |
| 6,517,503 B1* | 2/2003 | Naft | A61F 5/0125 600/592 |
| 8,678,979 B2* | 3/2014 | Stark | G16H 40/67 482/8 |
| 2004/0174337 A1* | 9/2004 | Kubota | G06F 3/016 345/156 |
| 2005/0006832 A1* | 1/2005 | Hoshi | F16D 7/10 267/154 |
| 2005/0113652 A1* | 5/2005 | Stark | A63B 24/0006 600/300 |
| 2007/0074945 A1* | 4/2007 | Ponson | F16D 41/07 192/41 A |
| 2007/0298893 A1* | 12/2007 | Yu | A63F 13/245 472/133 |
| 2008/0078647 A1* | 4/2008 | Watanabe | F16D 41/064 192/41 A |
| 2008/0236982 A1* | 10/2008 | Zhao | F16D 27/14 192/84.961 |
| 2008/0255489 A1* | 10/2008 | Genda | A61F 5/0102 602/27 |
| 2009/0192619 A1* | 7/2009 | Martin | A61F 2/60 623/18.11 |
| 2010/0156783 A1* | 6/2010 | Bajramovic | G06F 3/014 345/156 |
| 2010/0259472 A1* | 10/2010 | Radivojevic | G06F 3/017 345/156 |
| 2012/0025945 A1* | 2/2012 | Yazadi | H04L 69/28 340/4.2 |
| 2012/0157263 A1* | 6/2012 | Sivak | G06F 3/014 482/4 |
| 2013/0335314 A1 | 12/2013 | Chang et al. | |
| 2014/0116183 A1* | 5/2014 | Smith | G05G 13/00 74/490.12 |
| 2016/0162022 A1* | 6/2016 | Seth | G06F 3/017 345/156 |
| 2016/0187973 A1* | 6/2016 | Shankar | G09G 5/18 345/156 |
| 2017/0168565 A1* | 6/2017 | Cohen | A61B 5/0022 |
| 2019/0176320 A1* | 6/2019 | Smith | B25J 13/025 |

FOREIGN PATENT DOCUMENTS

| | | |
|---|---|---|
| CN | 107943288 A | 4/2018 |
| WO | 2016107679 A1 | 7/2016 |

\* cited by examiner

SMART WEARABLE APPARATUS, SMART WEARABLE EQUIPMENT AND CONTROL METHOD OF SMART WEARABLE EQUIPMENT

CROSS REFERENCE TO THE RELATED APPLICATIONS

This application is the national phase entry of International Application No. PCT/CN2018/115419, filed on Nov. 14, 2018, which is based upon and claims priority to Chinese Patent Application No. 201711140754.7, filed on Nov. 16, 2017, the entire contents of which are incorporated herein by reference.

TECHNICAL FIELD

The present invention relates to human-computer interaction, and more particularly, to smart wearable apparatus, smart wearable equipment, and a control method of the smart wearable equipment.

BACKGROUND

Virtual reality (VR) technology and augmented reality (AR) technology are important areas relating to simulation technology. People feel the same when experiencing VR technology and AR technology as they do in the real world because VR and AR produce the same feedback information to the brain and sensory receptors as that produced in the real world. With the rapid development of the many technologies associated with VR, including display technology, graphics and image processing technology, multimedia technology, tracking technology, parallel processing technology, the application of VR technology has gradually expanded and is now employed in many fields.

In the field of human-computer interaction technology such as VR and AR, if an otherwise tangible object such as a water cup or a flower, for example, exists in a virtual scene, a challenge now presented to skilled innovators is how to make users feel, although in VR and AR, as if they are gripping or holding the object in the real world.

Currently, in an implementation mode, those skilled in the game art, for example, have invented devices enabling the hand to sense an object in virtual reality. The device, such as a glove, is provided with a plurality of moveable concave and convex points on its palm surface. When simulating the object in a virtual scene, the device can adjust the concave and convex points according to the game to reflect back to the user the corresponding tactile sense in real time. In addition, after adjustment, the concave and convex points can simulate the sense of touching the hard/soft object, so as to simulate the sense of touching the object in the real world.

In another implementation mode, those skilled in the art have invented a controller that can be held in the hand. The controller is provided with a plurality of sensors to capture the relevant actions of the hand. When the user wants to grip the object in the virtual scene, the user can grip the controller by hand in the real scene. Alternatively, the user can grab, hold, release the controller to grab, hold, release the virtual object in the virtual scene.

For the implementation modes described above, however, the user can only experience the sense of contiguousness, or is required to grip a controller having a single size, which may not be at all consistent with the object. Therefore, current sensory creating and feedback devices and methods have limited utility in simulating sensory perception of gripping objects with different sizes in the virtual scene, and the user does not feel and hence respond to the feedback in the same manner as he/she would in the real world. The experience, therefore, has an artificial feel.

SUMMARY

In view of the above problems, embodiments of the present invention provide a smart wearable apparatus, smart wearable equipment, and a control method of the smart wearable equipment to solve the problems existing in the prior art.

In order to solve the above problems, the present invention provides a smart wearable apparatus, including a rigid body, at least one hinge mechanism, a brake and a controller;

the hinge mechanism is arranged on the rigid body, and the hinge mechanism includes a first pivot portion, a second pivot portion and a pivot arranged between the first pivot portion and the second pivot portion;

by means of the hinge mechanism, two portions of the rigid body, which are respectively connected to the first pivot portion and the second pivot portion of the hinge mechanism, can pivot relative to each other in a first direction; and the brake is connected to the hinge mechanism, and the brake can receive a first control signal from the controller to brake the hinge mechanism, thereby stopping the two portions of the rigid body from relatively pivoting.

In an embodiment of the smart wearable apparatus of the present invention, the smart wearable apparatus includes a plurality of hinge mechanisms, and a plurality of brakes for respectively braking the plurality of hinge mechanisms. Each of the plurality of hinge mechanisms is connected to the two portions of the rigid body.

In an embodiment of the smart wearable apparatus of the present invention, the plurality of hinge mechanisms and the plurality of brakes are arranged at positions corresponding to positions of joints of hand.

In an embodiment of the smart wearable apparatus of the present invention, the brake can stop the pivoting in the first direction and allow the pivoting in a second direction opposite to the first direction.

In an embodiment of the smart wearable apparatus of the present invention, the smart wearable apparatus further includes a wearable portion, and the wearable portion includes a glove body, a band or a tie corresponding to a finger and/or a palm of the hand. The wearable portion is fixedly connected to the rigid body.

In an embodiment of the smart wearable apparatus of the present invention, the brake is a clutch. The clutch includes a clutch outer ring, a clutch inner ring and a blocking member. One of the clutch outer ring and the clutch inner ring is connected to the first pivot portion of the hinge mechanism, and the other one of the clutch outer ring and the clutch inner ring is connected to the second pivot portion of the hinge mechanism. The blocking member can extend between the clutch outer ring and the clutch inner ring to limit relative rotations of the clutch outer ring and the clutch inner ring.

In an embodiment of the smart wearable apparatus of the present invention, the clutch is an overrunning clutch. The inner ring of the overrunning clutch includes a groove and a spring arranged in the groove. The blocking member can extend into the groove. The spring can press against the blocking member to provide a force to limit the relative rotations of the clutch outer ring and the clutch inner ring. When the speed of the clutch inner ring is greater than the speed of the clutch outer ring or the speed of the clutch outer ring is greater than the speed of the clutch inner ring, the overrunning clutch brakes the pivoting in the first direction and allows the pivoting in the second direction opposite to the first direction.

The present invention further provides smart wearable equipment, including the smart wearable apparatus described above, a case and a position sensor;

the case provides a virtual scene, and the position sensor is configured to collect at least one real position of the smart wearable apparatus and calculate at least one corresponding virtual position of the smart wearable apparatus in the virtual scene; and when the virtual position of the smart wearable apparatus in the virtual scene partially overlaps with a boundary of an object, the case outputs a control signal to the controller of the smart wearable apparatus to stop the corresponding hinge mechanism by the brake.

In an embodiment of the smart wearable equipment of the present invention, the position sensor is arranged on the smart wearable apparatus, or the position sensor is separated from the smart wearable apparatus.

The present invention further provides a control method of smart wearable equipment, including:

obtaining at least one real position of a target control object;

calculating a virtual position of the target control object in a virtual scene according to the real position; and when the virtual position is determined to at least partially overlap with a boundary position of a virtual object, outputting a control signal to stop a pivoting of at least one hinge mechanism of the target control object in a first direction.

The smart wearable apparatus, the smart wearable equipment, and the control method of the smart wearable equipment provided by the embodiments of the present invention include the following advantages.

In the smart wearable apparatus, the smart wearable equipment, and the control method of the smart wearable equipment provided by the present invention, the joints of the hand of the user grips something tightly to a maximum extent, thereby providing the sense of gripping and holding, and making the user feel as if he/she was gripping and holding the object in the virtual scene, which solves the problem of the poor gripping sense of the VR apparatus in the prior art. Compared with the prior art, the present invention does not concentrate on increasing or improving sensors to improve the smart wearable apparatus, instead, the present invention starts with the gripping sense of the user and fundamentally provides the user wearing the smart wearable apparatus with the sense of gripping objects.

The foregoing descriptions are summary of the technical solution of the present invention. In order to make the technical means of the present invention clearer, to make the present invention implemented in accordance with the content of the specification, and to make the above and other purposes, features and advantages of the present invention more obvious and pellucid, the present invention is described in detail below in reference with the specific embodiments.

BRIEF DESCRIPTION OF THE DRAWINGS

In order to more clearly illustrate the technical solutions in the embodiments of the present invention or the prior art, the drawings used in the description of the embodiments or the prior art are briefly introduced below. Obviously, the drawings described below are some embodiments of the present invention, and for those skilled in the art, other drawings can be obtained according to these drawings without creative effort.

DETAILED DESCRIPTION OF THE EMBODIMENTS

In order to make the objectives, technical solutions and advantages of the embodiments of the present invention clearer, the technical solutions in the embodiments of the present invention are described clearly and completely below in combination with the drawings in the embodiments of the present invention. Obviously, the described embodiments are only examples of embodiments of the present invention, not all of the embodiments. Based on the embodiments of the present invention, all other embodiments obtained by those skilled in the art without creative effort shall fall within the scope of protection of the present invention.

Embodiment 1

Figure 1:
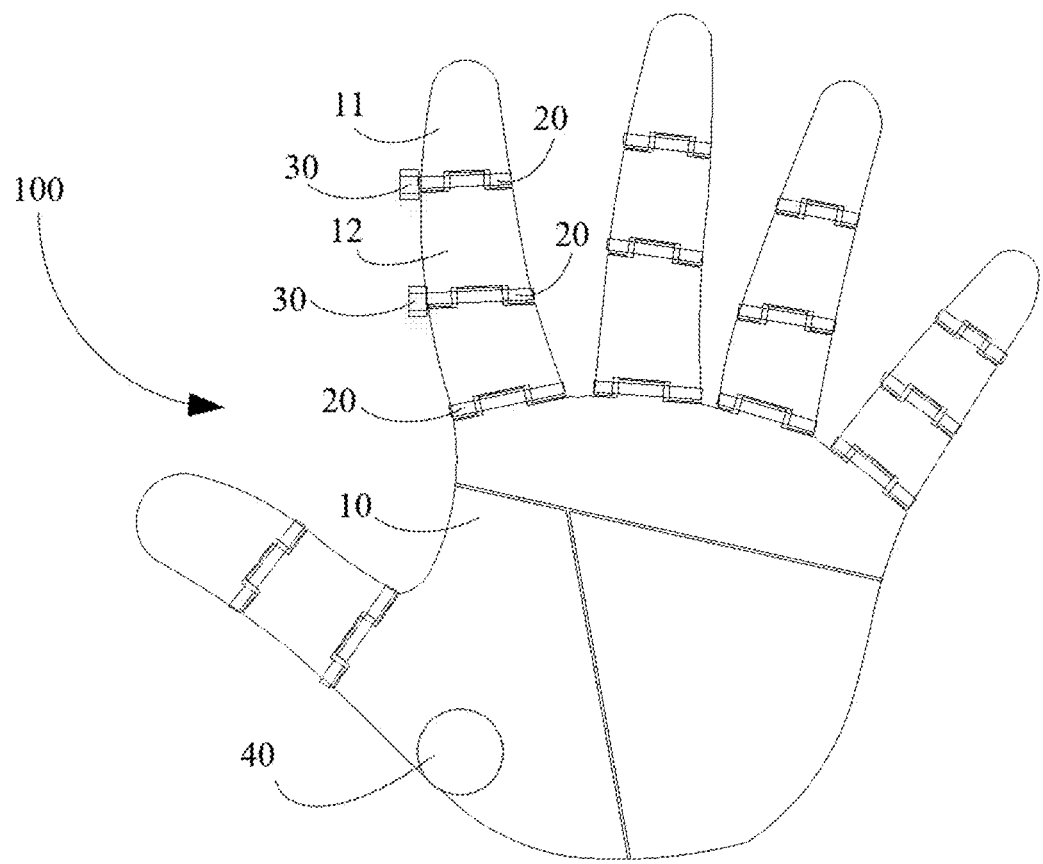
FIG. 1 is a front view of the smart wearable apparatus of the embodiment of the present invention.

The embodiment of the present invention provides a smart wearable apparatus. FIG. 1 shows the front view of the smart wearable apparatus 100, and FIG. 2 shows a side view of the smart wearable apparatus 100 along another angle.

Figure 2:
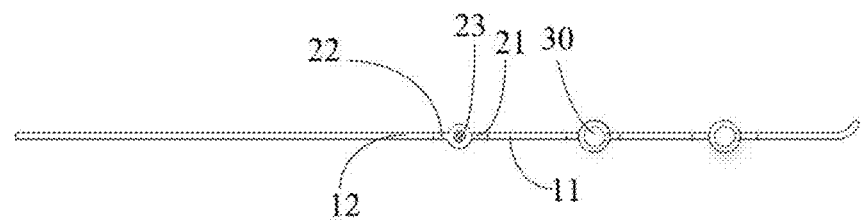
FIG. 2 is a side view of the smart wearable apparatus of the embodiment of the present invention.

As shown in FIGS. 1 and 2, the smart wearable apparatus 100 is a VR (virtual reality) glove matched with a VR apparatus, or an AR (augmented reality) glove with an AR apparatus, which includes the rigid body 10, at least one hinge mechanism 20, the brake 30, and the controller 40.

In an optional embodiment, the smart wearable apparatus 100 may further include a wearable portion (not shown in the figures), such as a soft glove, a soft or rigid band, a strap and others, and the wearable portion is fixedly connected to the palm of the user. In an optional embodiment, the smart wearable apparatus may further include a power supply device (not shown in the figures) for providing power.

In the present embodiment, the rigid body 10 may be matched with the palm of the user in shape, which includes a finger portion and a palm portion. The rigid body 10 is provided with the hinge mechanism 20. For example, a plurality of hinge mechanisms 20 may be arranged at positions corresponding to the positions of the joints of hand of the user, respectively. According to the connection relationship between the hinge mechanism 20 and the rigid body 10 shown at the upper left of FIG. 1, the rigid body 10 is divided by the hinge structure 20 into the first portion 11 and the second portion 12.

As shown in FIG. 2, the hinge mechanism 20 includes the first pivot portion 21, the second pivot portion 22, and the pivot 23 arranged between the first pivot portion 21 and the second pivot portion 22. By means of the hinge mechanism 20, the first portion 11 of the rigid body 10 connected to the first pivot portion 21 of the hinge mechanism 20 and the second portion 12 of the rigid body 10 connected to the second pivot portion 22 of the hinge mechanism 20 can pivot relative to each other in a first direction. The first direction is, for example, the same as the direction in which the joints of hand of the user bends.

The brake 30 is connected to the hinge mechanism 20, and the brake 30 can receive a first control signal from the controller to stop the hinge mechanism 20, thereby stopping the first portion 11 and the second portion 12 of the rigid body 10 from relatively pivoting.

The controller 40 may be arranged on the rigid body 10 as shown in FIG. 1 or on other positions of the smart wearable apparatus.

In an optional embodiment, as shown in FIG. 1, the smart wearable apparatus 100 includes a plurality of hinge mechanisms 20, and a plurality of brakes 30 for respectively stopping the plurality of hinge mechanisms 20. Each of the plurality of hinge mechanisms 20 is connected to two portions of the rigid body 10, so that the two portions can pivot by the hinge mechanism 20.

In an optional embodiment, the plurality of hinge mechanisms 20 and the plurality of brakes 30 are arranged at positions corresponding to the positions of the joints of hand of the user, so that the smart wearable apparatus better fits contours of the hand of the user to provide a more realistic feeling.

In an optional embodiment, the first portion 11 and the second portion 12 of the rigid body 10 connected to the hinge mechanism 20 can pivot relative to each other in a second direction opposite to the first direction. In an optional embodiment, the brake 30 can stop the pivoting in the first direction and allow the pivoting in the second direction opposite to the first direction.

Figure 3:
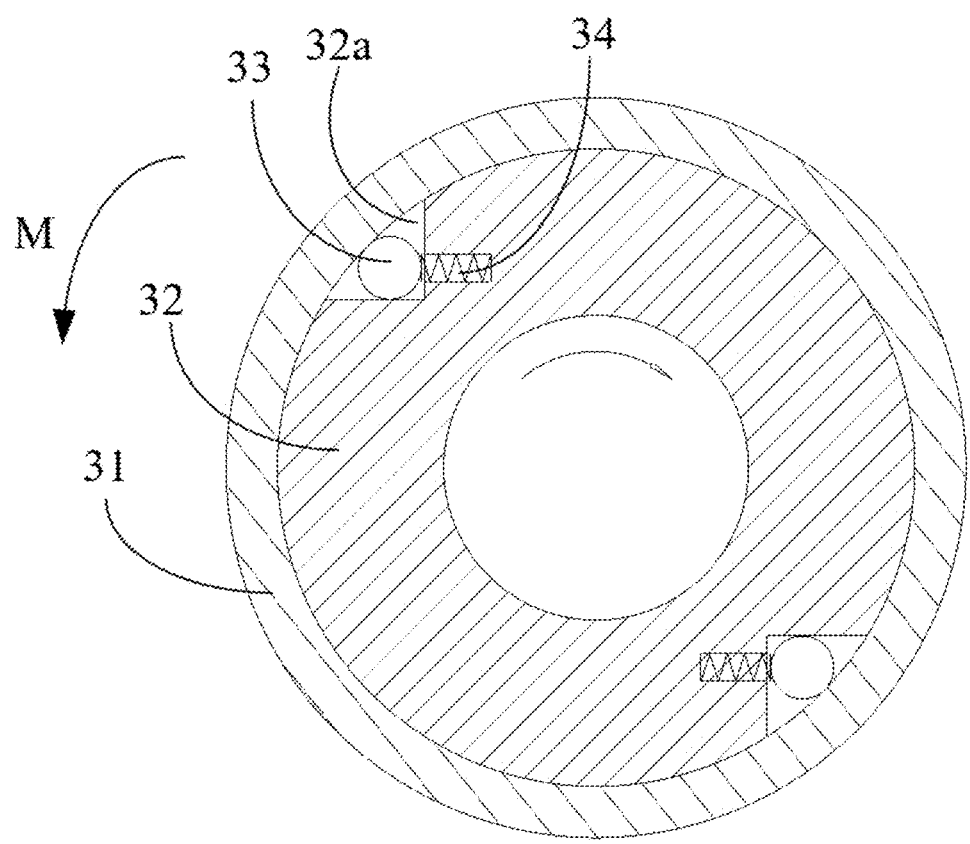
FIG. 3 is a cross-sectional view of the overrunning clutch used by the smart wearable apparatus shown in FIGS. 1 and 2.

In an optional embodiment, the brake 30 is a clutch. As shown in FIG. 3, the clutch includes the clutch outer ring 31, the clutch inner ring 32, and the blocking member 33.

One of the clutch outer ring 31 and the clutch inner ring 32 is connected to the first pivot portion 21 of the hinge mechanism 20, and the other one of the clutch outer ring 31 and the clutch inner ring 32 is connected to the second pivot portion 22 of the hinge mechanism 20. The blocking member 33 can extend between the clutch outer ring 31 and the clutch inner ring 32 to limit the relative rotations of the clutch outer ring 31 and the clutch inner ring 32, thereby limiting the relative motions of the first portion 11 and the second portion 12 of the rigid body 10.

In an optional embodiment, the clutch is an overrunning clutch, and the inner ring 32 of the overrunning clutch includes the groove 32a provided along the axial direction of the overrunning clutch, the blocking member 33 and the spring 34, wherein the blocking member 33 and the spring 34 are arranged in the groove 32a. From the cross-sectional direction shown in FIG. 3, the groove 32a has a larger cross section at one end and a smaller cross section at the other end. The cross section at the end of the groove 32a adjacent to the spring 34 is larger than the cross section at the other opposite end. The cross section of the groove 32a may be in a fan shape as shown in FIG. 3, or other shapes such as triangles, cones, and others, which are not limited by the present invention.

The blocking member 33 may be a cylinder capable of extending into the groove 32a. The spring 34 can press against the blocking member 33 to provide a force to limit the relative rotations of the clutch outer ring 31 and the clutch inner ring 32.

In general, the blocking member 33 of the overrunning clutch does not extend into the groove 32a, so the outer ring 31 and the inner ring 32 move without interference with each other. Accordingly, the first pivot portion 21 and the second pivot portion 22 of the hinge mechanism 20 which are respectively connected to the inner ring 32 and the outer ring 31 move without interference with each other, and the first portion 11 and the second portion 12 of the rigid body 10 also move without interference with each other. When it is required to stop the hinge mechanism, however, the power supply device can provide power to drive the blocking member 33 to extend into the groove 32a of the clutch inner ring 32, and the spring 34 presses against the blocking member 33, so that the clutch outer ring 31 cannot move in the first direction M relative to the clutch inner ring 32. Accordingly, the first pivot portion 21 and the second pivot portion 22 of the hinge mechanism 20 cannot move toward the first direction M, and the first portion 11 and the second portion 12 of the rigid body 10 cannot move toward the first direction M.

For example, the clutch inner ring 32 is connected to the first pivot portion 21 of the hinge mechanism 20 and is indirectly connected to the first portion 11 of the rigid body 10, and the clutch outer ring 31 is connected to the second pivot portion 22 of the hinge mechanism 20 and is indirectly connected to the second portion 12 of the rigid body 10. In normal operation, when the user wants to hold an object in the virtual scene, the second portion 12 of the rigid body 10 does not move, and the first portion 11 pivots toward the second portion 12. However, when the boundary of the object in the virtual scene coincides with the position of the hand of the user, the user can no longer hold the object, so the controller 40 issues an instruction, and then the power supply device drives the blocking member 33 to insert between the clutch outer ring 31 and the clutch inner ring 32, so that the clutch outer ring can no longer move in the first rotation direction M relative to the clutch inner ring 32. When the user feels that he/she cannot continue to clench his/her hand, the controller concludes that he/she has gripped the object in the virtual scene.

However, when the user wishes to loosen his hand, since the cross section of one end of the groove 32a is larger than the cross section of the other side of the groove 32a, as the clutch outer ring 31 moves in the second direction opposite to the first direction M, the blocking member 33 is pushed to the end with the larger cross section, so at this time the overrunning clutch is used to allow pivoting in the second direction opposite to the first direction.

For those skilled in the art, it is clear that the above is an example using an overrunning clutch, but those skilled in the art can make any feasible replacement, such as replacing the overrunning clutch with any one-way or two-way ordinary clutch. When the user needs to hold the object in the virtual scene, after the boundary of the position of the hand of the user at least partially overlaps with the boundary of the object, the controller (e.g., the control device of the smart wearable apparatus or other external control device) sends a signal to initiate the clutch and stop the pivoting in the first direction. For the one-way clutch, the pivoting in the second direction is not stopped; and for the two-way clutch, if the hand of the user is sensed to move in the second direction (that is, releasing the object), the control signal can be used to release the braking of the clutch, which is not limited here.

In an optional embodiment, the plurality of hinge mechanisms 20 includes a first part of hinge mechanisms corresponding to the knuckles of the finger, such as the hinge mechanisms corresponding to the finger in FIG. 1, and further includes a second part of hinge mechanisms corresponding to the middle of the palm, such as two long-strip hinge mechanisms in the palm of FIG. 1, wherein these long-strip hinge mechanisms can be used for passive bending without being connected to the brake.

As can be seen from the above, the smart wearable apparatus provided by the present invention makes the user feel his/her knuckles grip objects tightly to a maximum extent to provide the sense of gripping and holding, thereby making the user feel as if he/she was gripping and holding the object in the virtual scene. Compared with the prior art, the present invention does not concentrate on increasing or improving sensors to improve the smart wearable apparatus, instead, starts with the gripping sense characteristic of the user and fundamentally provides the user wearing the smart wearable apparatus with the sense of griping the object.

As preferred in the present invention, the one-way clutch such as the overrunning clutch can be used to stop a pivoting in one direction and allow a pivoting in the other direction, and when the user wants to "release" the object in the virtual scene, the action of the user is not restricted, which improves the sense of reality during use.

Embodiment 2

Figure 4:
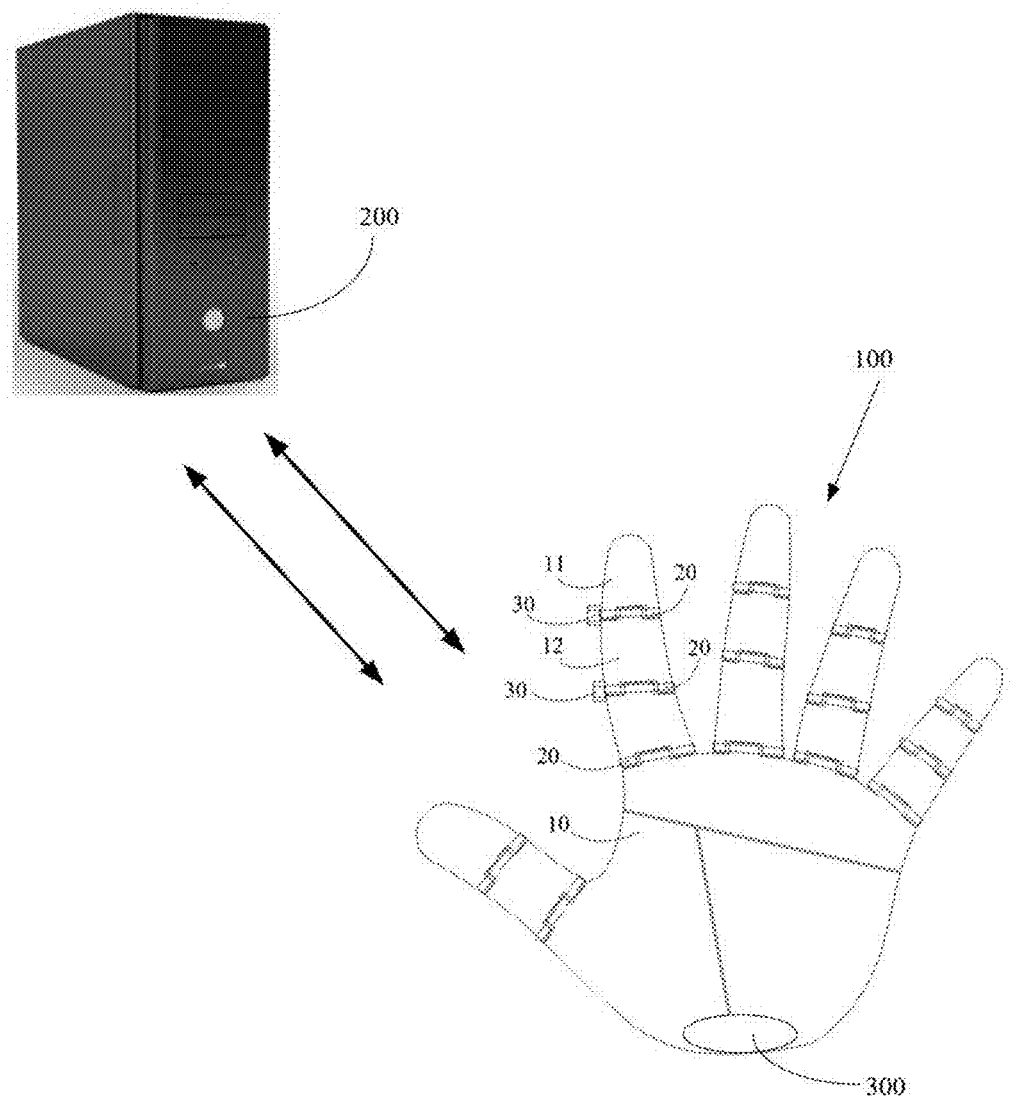
FIG. 4 is a schematic view of an example of the smart wearable equipment of the present invention.

The second embodiment of the present invention further provides smart wearable equipment, including the exemplary smart wearable apparatus 100 described above. As shown in FIG. 4, the smart wearable equipment further includes the case 200 and the position sensor 300.

The case 200 can provide a virtual scene through built-in software and hardware, and the position sensor 300 is configured to collect at least one real position of the smart wearable apparatus 100 and calculate at least one corresponding virtual position of the smart wearable apparatus 100 in the virtual scene.

In one embodiment, as shown in FIG. 4, the position sensor 300 is arranged on the smart wearable apparatus 100, such as a VR glove. In other embodiments, the position sensor 300 may also be arranged on other locations, for example, the position sensor 300 is worn separately on a hand of the user, or the position sensor is arranged at other position for sensing the activity of the hand, and the like. The position sensor 300 is independent of the smart wearable apparatus 100.

At least one position sensor 300 may be provided. If two or more position sensors 300 are provided, the shape and current position of the hand of the user can be simulated according to the actual collected position data, and converted by the conversion program into the virtual scene to obtain the shape, position and boundary of the hand of the user in the virtual scene. If only one position sensor 300 is provided, the position sensor 300 can collect the current position of the hand, and the position of the hand can be simulated using the built-in simulation program of the software installed in the case after considering the general size of human hands. Then, the simulated position of the hand is converted by the conversion program into the virtual scene to obtain the shape, position and periphery of the hand of the user in the virtual scene.

The object that exists in the virtual scene has the corresponding coordinates thereof in the virtual scene, and the position of each point of the hand of the user in the virtual scene can be obtained and calculated by the position sensor. Therefore, when the virtual position of the smart wearable apparatus 100 in the virtual scene partially overlaps with the boundary of the object, the case 200 can output a control signal to the controller 40 of the smart wearable apparatus 100. The controller 40 sends a signal to the brake 30, and then the brake 30 stops the corresponding hinge mechanism 20 to prevent the relative pivoting of the first portion 11 and the second portion 12 of the rigid body 10.

As can be seen from the above, the smart wearable equipment provided by the present invention includes the case, the position sensor and the smart wearable apparatus. The position sensor is configured to obtain the real position and convert the real position into the position in the virtual scene. The smart wearable apparatus makes the user feel his/her knuckles grip objects tightly to a maximum extent to provide the sense of gripping and holding, thereby making the user feel as if he/she was gripping and holding the object in the virtual scene. Compared with the prior art, the present invention does not concentrate on increasing or improving sensors to improve the smart wearable apparatus, instead, starts with the gripping sense characteristic of the user and fundamentally provides the user wearing the smart wearable apparatus with the sense of griping the object.

As preferred in the present invention, in combination with the smart wearable apparatus relevantly described in the first embodiment, the one-way clutch such as the overrunning clutch can be used to stop a pivoting in one direction and allow a pivoting in the other direction, and when the user wants to "release" the object in the virtual scene, the action of the user is not restricted, which improves the sense of reality during use.

Embodiment 3

Figure 5:
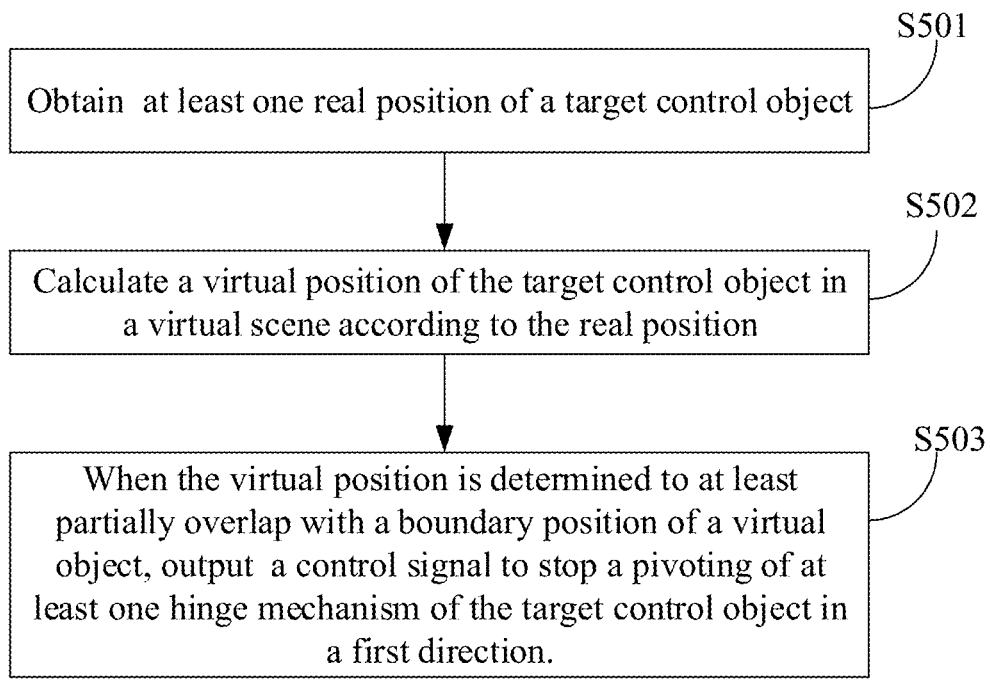
FIG. 5 is a flowchart of a control method of the smart wearable equipment.

The third embodiment of the present invention provides a control method of smart wearable equipment. As shown in FIG. 5, the method may include the following steps.

S501: at least one real position of the target control object is obtained;

wherein, in this step, the target control object is, for example, the hand of the user, or the aforementioned smart wearable apparatus or the like. One or more real positions of the target control object can be collected by the position sensor of the smart wearable equipment for subsequent calculation and processing.

S502: the virtual position of the target control object in the virtual scene is calculated according to the real position;

wherein, in this step, the case of the smart wearable equipment can calculate the virtual position in the virtual scene corresponding to the real position through the software. For example, the real position can be calibrated according to the coordinates of the coordinate system (such as, a space with a length of n meters, a width of n meters and a height of n meters) that is collected by the sensor to obtain the real position represented by the three-dimensional coordinates (x, y, z). When the real position is transmitted to the software, the coordinate position in another virtual coordinate space is calculated as (x1, y1, z1). The solution of calculating the virtual position according to the real position is existing in the prior art, which is not repeated here.

S503: when the virtual position is determined to at least partially overlap with the boundary position of the virtual object, a control signal is output to stop the pivoting of at least one hinge mechanism of the target control object in the first direction;

wherein, in this step, a virtual object to be held by the user exists in the virtual scene, the virtual object has a boundary position, and the boundary position is, for example, composed of a plurality of coordinate points. When the virtual position of the target control object at least partially overlaps with the boundary position, the pivoting of at least one hinge mechanism of the target control object in the first direction is stopped, so that the user feels he/she has gripped the target control object.

As can be seen from the above, the control method of the smart wearable equipment provided by the present invention can control the smart wearable apparatus according to the virtual position and the boundary position of the virtual object to enable the user to have the sense of griping, so that the user can feel as if he/she was griping the object in the virtual scene. Compared with the prior art, the present invention fundamentally provides the user wearing the smart wearable apparatus with the true sense of griping the object.

The preferred embodiments of the present invention have been described above, but any change and modification may be made to these embodiments once those skilled in the art have mastered the basic creative concepts. Therefore, the appended claims are intended to be construed as including the preferred embodiments and all changes and modifications falling within the scope of the embodiments of the present invention.

Finally, it should be noted that in this specification, relational terms, such as first and second, are used only to distinguish one entity or operation from another entity or operation, and do not necessarily require or imply any actual relationship or order between these entities or operations. Moreover, the term "include", "compose" or any other variant thereof is intended to cover non-exclusive inclusion so that a process, method, article or terminal device which includes a series of elements includes not only those recited elements, but also other elements that are not explicitly listed, or elements inherent in such a process, method, article or terminal device. Without more restrictions, the element defined by the statement "includes a" does not preclude the existence of other identical elements in the process, method, article, or terminal device that includes the element.

The smart wearable apparatus, smart wearable equipment, and the control method of the smart wearable equipment provided by the present invention are described above in detail. In this specification, the specific embodiments are used to explain the principle and implementation of the present invention. The description of the above embodiments is only used to help understand the method and core idea of the present invention. Meanwhile, for those skilled in the art, according to the ideas of the present invention, some changes may exist in the specific mode of implementation and the scope of application. In summary, the contents of the specification should not be understood as a restriction on the present invention.

What is claimed is:

1. A smart wearable apparatus, comprising a rigid body, a hinge mechanism, a brake and a controller; wherein,
    the hinge mechanism is arranged on the rigid body, and the hinge mechanism comprises a first part corresponding to knuckles of a finger and a second part corresponding to a middle of a palm, the first part of the hinge mechanism has a first pivot portion, a second pivot portion and a pivot arranged between the first pivot portion and the second pivot portion, the second part of the hinge mechanism includes two long-strip hinge mechanisms that bend without being connected to the brake;
    by the hinge mechanism, a first portion of the rigid body and a second portion of the rigid body pivot relative to each other in a first direction, wherein the first portion of the rigid body is connected to the first pivot portion of the hinge mechanism and the second portion of the rigid body is connected to the second pivot portion of the hinge mechanism;
    the brake is discrete from the hinge mechanism and connected to the hinge mechanism by way of the first and second pivot portions, the brake receives a first control signal from the controller to stop the hinge mechanism, and the hinge mechanism is stopped to prevent the first portion of the rigid body and the second portion of the rigid body from relatively pivoting;
    the brake stops a pivoting in the first direction and allows a pivoting in a second direction opposite to the first direction;
    the brake is an overrunning clutch, and the overrunning clutch comprises a clutch outer ring, a clutch inner ring and a blocking member; the clutch outer ring is connected to the first pivot portion of the hinge mechanism and the clutch inner ring is connected to the second pivot portion of the hinge mechanism, or the clutch inner ring is connected to the first pivot portion of the hinge mechanism and the clutch outer ring is connected to the second pivot portion of the hinge mechanism; the blocking member extends between the clutch outer ring and the clutch inner ring to limit relative rotations of the clutch outer ring and the clutch inner ring; and
    the smart wearable apparatus further comprises a plurality of hinge mechanisms, and a plurality of brakes configured to respectively stop the plurality of hinge mechanisms; wherein each of the plurality of hinge mechanisms is connected to the first portion of the rigid body and the second portion of the rigid body.

2. The smart wearable apparatus of claim 1, wherein the plurality of hinge mechanisms and the plurality of brakes are arranged at positions corresponding to positions of joints of a hand.

3. The smart wearable apparatus of claim 1, further comprising a wearable portion, wherein the wearable portion comprises a glove body, a band or a tie, the glove body, the band or the tie corresponds to a finger of a hand and/or a palm of the hand; and the wearable portion is fixedly connected to the rigid body.

4. The smart wearable apparatus of claim 1, wherein the clutch inner ring of the overrunning clutch comprises a groove and a spring arranged in the groove; the blocking member extends into the groove; the spring presses against the blocking member to provide a force to limit the relative rotations of the clutch outer ring and the clutch inner ring; when a speed of the clutch inner ring is greater than a speed of the clutch outer ring or the speed of the clutch outer ring is greater than the speed of the clutch inner ring, the overrunning clutch stops the pivoting in the first direction and allows the pivoting in the second direction opposite to the first direction.

5. A smart wearable equipment, comprising the smart wearable apparatus of claim 1, a case and a position sensor; wherein
    the case provides a virtual scene, and the position sensor is configured to collect at least one real position of the smart wearable apparatus and calculate at least one virtual position of the smart wearable apparatus in the virtual scene, wherein the at least one virtual position of the smart wearable apparatus in the virtual scene corresponds to the at least one real position of the smart wearable apparatus; and
    when the at least one virtual position of the smart wearable apparatus in the virtual scene partially overlaps with a boundary of an object, the case outputs a control signal to the controller of the smart wearable apparatus to stop the hinge mechanism by the brake.

6. The smart wearable equipment of claim 5, wherein the position sensor is arranged on the smart wearable apparatus, or the position sensor is separated from the smart wearable apparatus.

7. The smart wearable equipment of claim 5, wherein the plurality of hinge mechanisms and the plurality of brakes are arranged at positions corresponding to positions of joints of a hand.

8. The smart wearable equipment of claim 5, further comprising a wearable portion, wherein the wearable portion comprises a glove body, a band or a tie, the glove body, the band or the tie corresponds to a finger of a hand and/or a palm of the hand; and the wearable portion is fixedly connected to the rigid body.

9. The smart wearable equipment of claim 5, wherein the clutch inner ring of the overrunning clutch comprises a groove and a spring arranged in the groove; the blocking member extends into the groove; the spring presses against the blocking member to provide a force to limit the relative rotations of the clutch outer ring and the clutch inner ring; when a speed of the clutch inner ring is greater than a speed of the clutch outer ring or the speed of the clutch outer ring is greater than the speed of the clutch inner ring, the overrunning clutch stops the pivoting in the first direction and allows the pivoting in the second direction opposite to the first direction.

10. The smart wearable equipment of claim 7, wherein the position sensor is arranged on the smart wearable apparatus, or the position sensor is separated from the smart wearable apparatus.

11. The smart wearable equipment of claim 8, wherein the position sensor is arranged on the smart wearable apparatus, or the position sensor is separated from the smart wearable apparatus.

12. The smart wearable equipment of claim 9, wherein the position sensor is arranged on the smart wearable apparatus, or the position sensor is separated from the smart wearable apparatus.

* * * * *